2 Sheets—Sheet 1.
L. R. WRIGHT.
Corn Planter.
No. { 1,104, 32,108. }
Patented Apr. 16, 1861.
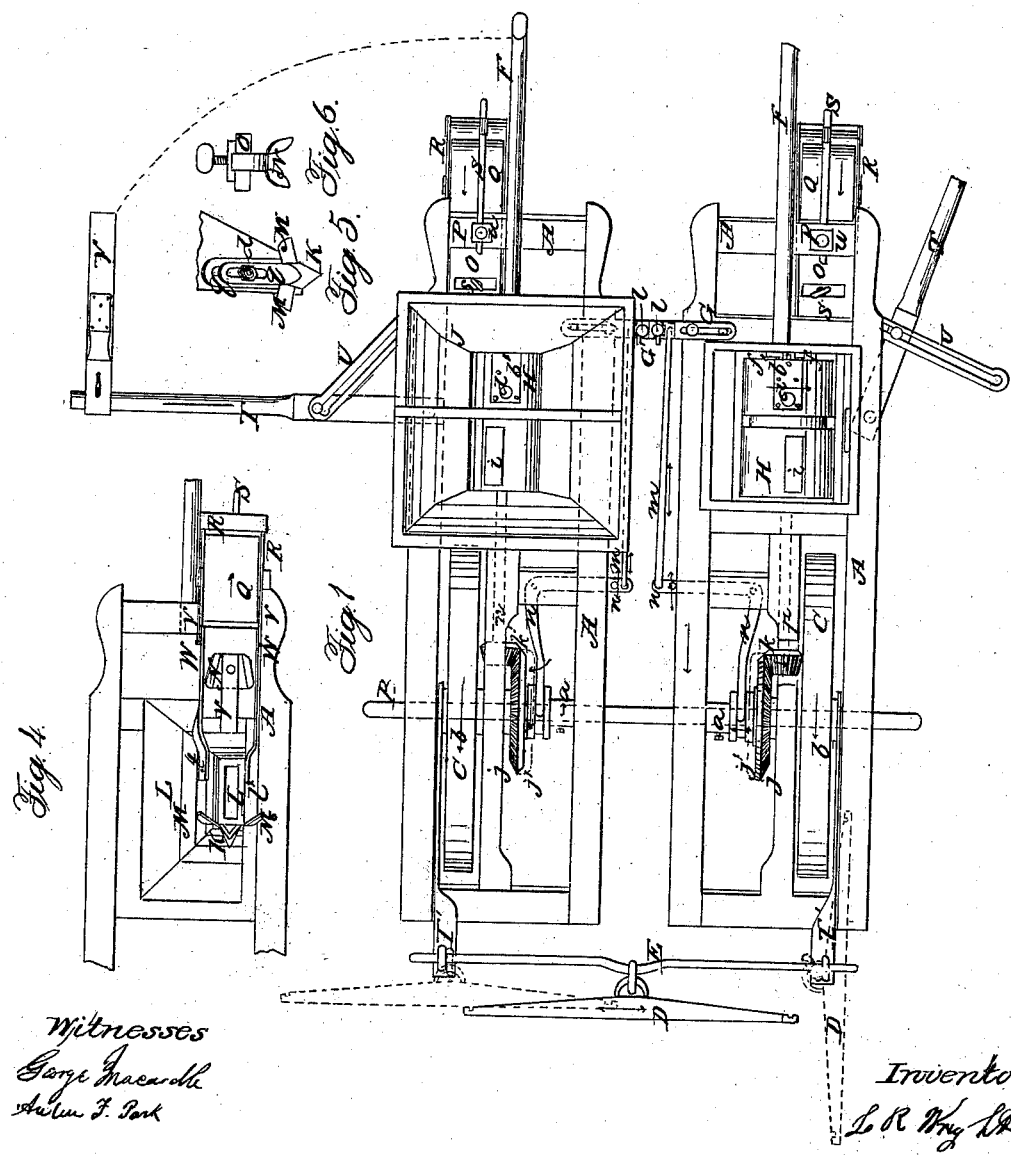

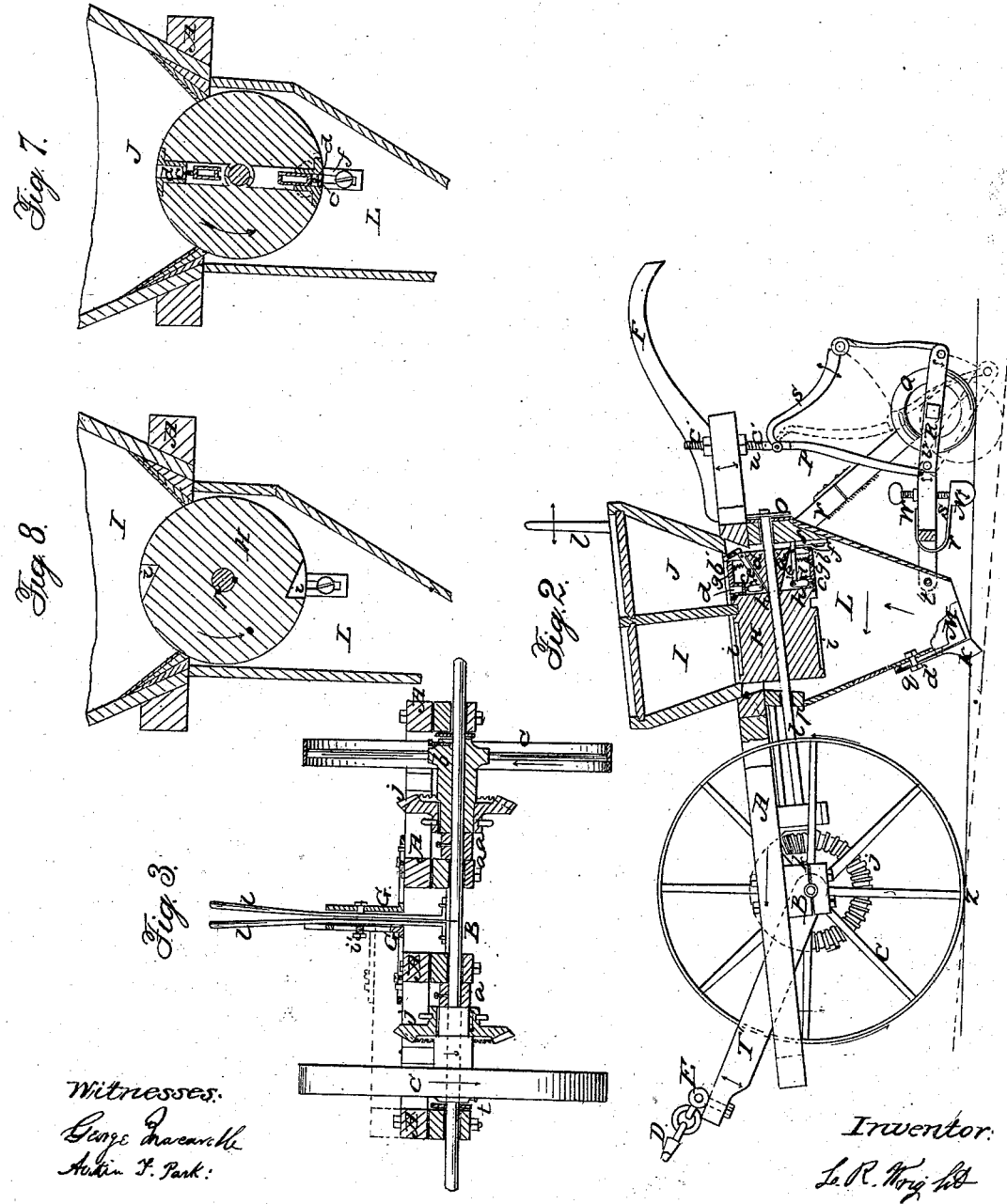

UNITED STATES PATENT OFFICE.

LEWIS R. WRIGHT, OF COHOES, NEW YORK, ASSIGNOR TO HIMSELF AND THOMAS R. HOWARD, OF SAME PLACE.

IMPROVEMENT IN SEED-PLANTERS.

Specification forming part of Letters Patent No. 32,108, dated April 16, 1861.

*To all whom it may concern:*

Be it known that I, LEWIS R. WRIGHT, of the village of Cohoes, in the county of Albany and State of New York, have invented certain new and useful Improvements in Seed-Planters; and I do hereby declare that the following contains a full and exact description thereof, reference being had to the annexed drawings, in which—

Figure 1 is a plan of a seed-planter having all my said improvements, some parts of the machine being removed or broken away. Fig. 2 is a side elevation and partial longitudinal section of the same seed-planter. Fig. 3 is a partial transverse section and elevation of the same. Fig. 4 is a plan of the under side of one of the planting devices of the machine. Fig. 5 is a front view of the plow or furrow-opener, and Fig. 6 a front view of the seed-coverer of the machine; and Figs. 7 and 8 are transverse sections of its seeding-cylinder on a larger scale than the other drawings.

The same letters refer to like parts in all the figures, and the arrows therein indicate the directions in which the parts move.

One part of my invention consists of a certain adjustable seed-dropping device constructed as follows, to wit: J is a seed box or hopper. H is a revolving cylinder, a side of which forms the bottom of the seed-box. The cylinder H has a tubular or cylindrical seed-cell, $d$, or two or more such cells, arranged radially within it. As the cylinder H revolves each seed-cell $d$ is alternately directed upward into the seed-box J and downward into a tube, L, that guides the seed to the ground. In each seed-cell $d$ a piston, $c$, is fitted to slide. The shank $h$ of each piston is pivoted or jointed to one arm of a lever, $e$, which extends lengthwise of and has its fulcrum $a'$ in the cylinder H, and has its other arm extended beyond the end of the seeding-cylinder. While a seed-cell, $d$, is directed upward into the hopper J, a spring, $g$, keeps the piston $c$ down in the cell, as shown on the upper side of the cylinder H in Figs. 2 and 7, so that the seed in the seed-box may surely fall into and fill the seed-cell. While the seed-cell is directed downward, the spring $g$ is then overcome by a fixed cam, $f$, against which the projecting end of the lever $e$ strikes, and is thereby moved, so as to quickly force the piston $c$ outward to the mouth of the seed-cell, as shown on the lower side of the cylinder H in Figs. 2 and 7, and thereby discharge the seed from the cell by a positive motion. The piston $c$ is in the form of a cylindrical-headed screw, which can be turned either farther in or out of its shank-stock $h$, so as to thereby either increase or lessen the depth of the seed-cell, and the cam $f$ may be adjustable, so that it will move the lever $e$, and thereby the piston $c$, a greater or a less distance; or the above-described seed-dropping device may be made so adjustable that it will receive and positively discharge a greater or a less quantity of seed by means of any other suitable contrivance—as, for instance, by means of a screw, $b'$, acting against the projecting arm of the lever $e$, so as to thereby limit the retreat of the lever $e$ and attached piston $c$ to various distances. A hopper, I, may be arranged for holding plaster or other fertilizer on a part of the cylinder H, in which may be cups $i$ $i$, so arranged as to discharge a little of the fertilizer with the seed ejected from the cells $d$.

Now, I do not claim as new a revolving seeding-cylinder provided with seed-cells having movable bottoms or sliding discharge-pistons, nor a bottom or piston having a screw on its shank for making the seed-cell adjustable; nor do I claim the emptying of a revolving seed-cell by a positive movement of a slide or piston therein; but I do believe that the combination of the lever $e$, cam $f$, and spring $g$ with the piston $c$ in the radial seed-cells $d$ of the revolving cylinder H, which forms the bottom of a seed-box, J, as above described, and represented by the annexed drawings, so that the whole combination constitutes an adjustable seed-dropping device in which the seed-cell is emptied with a positive movement of the piston, and the piston retracted within the seed-cell by the device itself, independently of gravity, whatever may be the size to which the seed-cell is temporarily adjusted, is new.

Another part of my invention consists of a certain adjustable planting device constructed as follows, to wit: The plow or furrow-opener K, with or without the leveling and clod-removing shares M, is attached to a descending part, L, of the main frame A, the front end of which frame is supported by the axle of the carrying wheel or wheels C, arranged forward of the plow. The coverer N is carried by a block or frame, O, which is hung at its front end, t, to a downward-projecting part, L, of the frame A, and is connected at its rear end to the hind part of the frame A by means of a rod or hanger, P, made adjustable up and down by means of a screw, c', and nuts u u, or by any equivalent means. The roller Q, which rolls along on the ground behind the coverer N and sustains the rear part of the machine, is mounted in a frame, R, which is hung at its front end, v, so as to turn up and down on the rear end of the block O, that carries the coverer, the frame R being limited in its upward movement in respect to the frame O by any suitable stop or stops, w. The rear end of the frame R is connected with the hind part of the frame A by means of a rule-joint brace, S, hung to the frame R, and hinged at its upper end to the frame A or the adjusting-hanger P of the frame O. By bending the jointed brace S outward, as shown in full lines in Fig. 2, the frame A is thereby let down, so as to bring the plow K and coverer N into action upon the soil, as in planting, and by straightening the brace S, as indicated by the dotted lines in Fig. 2, the frame A is thereby so raised up as to bring both the plow and coverer above the ground and out of the way of obstructions which might be run over in drawing the machine from place to place, the jointed brace S alone serving to keep the frame A in its elevated position. The line Z Z in Fig. 2 represents the surface of the ground when the jointed brace S is bent so as to leave the frame R loose and the plow and coverer in action upon or in the soil; and the dotted line Z Y indicates the surface of the ground in respect to the machine when the brace S is straightened, so as to hold the frame R rigid and the plow and coverer above the ground. By means of the adjusting hanger P the rear end of the frame O can be raised and lowered in respect to the frame A, so that thereby the plow K and coverer N may be together adjusted to act more or less deeply upon the soil.

The coverer N may be made adjustable independently of the plow K M by securing the coverer to the block O by means of a spring or movable holder, r, and a screw, s, so that thereby the machine may be adjusted to put more or less earth over the seed, while the furrow in which the seed is dropped continues to be made of the same depth; or the plow K and leveler M may be made adjustable independently of each other and of the coverer N by having slotted shanks q and a screw-bolt, d', so that the furrows may be made of different depths by the plow, and more or less earth struck off from the edges of the furrows by the leveler, while the action of the seed-coverer N remains unaltered.

The plow K M, coverer N, and roller Q have been heretofore combined and arranged in seed-planters, and in such cases the plow and the coverer have been made adjustable, and have been thrown into and out of action upon the soil by means of a device or devices worked by the person operating the machine, and I do not claim a seed-planter having that feature or features; but what I believe is new in the planting apparatus above described is the whole combination and arrangement of the adjustable block O, carrying the coverer N, and the hinged frame R, carrying the roller Q, with the frame A, carrying the plow K, and supported forward of the plow by a wheel, C, substantially as above described, and shown by the annexed drawings, so that while the plow and coverer can be adjusted thereby so as to act more or less deeply upon the soil, the driver, when walking behind the machine and guiding it with his hands, can then raise and hold the plow and coverer above the ground by simply pushing with his foot for an instant against the brace S, so as to straighten the latter, and can also lower the plow and coverer and keep them in action upon the soil by merely kicking back the brace S, so as to bend it.

Another part of my invention consists in the so constructing, hanging, and arranging, substantially as hereinafter described, and shown by the annexed drawings, upon the one cylindrical or driving axle B of two carrying and driving wheels, C C, two separate frames, A A, each provided with separate, adjustable, and equal seed dropping and planting devices, substantially such as or equivalents for those hereinbefore described, that while the seeding devices are driven by the wheels C C or their axle B, and the two frames A A are adjustable to different distances apart on the axle B, the seeding and planting devices of each frame can be thrown into and out of action independently, and the frames A A will under all circumstances of use each rise and fall independently of the other to suit the condition or unevenness of the ground to be planted or traveled over. In the annexed drawings, the two frames A A, Figs. 1 and 3, are set at different distances apart on the axle B (to adapt the machine for simultaneously planting two rows at a greater or less distance from each other) by means of set-screws b in the hubs of the wheels C C, or by means of set-collars a a on the axle B. The two wheels C C are of equal diameter and turn the two seeding-cylinders H H in the frames A A by means of equal bevel-wheels j j on the wheels C C, in connection with the two equal bevel-pinions k k on the axles p p of the seeding-cylinders H H. While the machine is being drawn along the seeding-cylinders H H can be either simultaneously or separately stopped and set in motion as may be required in planting rows of different length, and in regulating the seeding devices so as to drop the seed simultaneously or alternately, as may be desired, by means of hand-levers l l, hung on the bolt i', in combination with the link-rods m m and the forked elbow-levers $n$ $n$, acting on the bevel-wheels $j$ $j$, which are fitted to slide into and out of gear with the pinions $k$ $k$, as indicated by the dotted lines at $j'$ $j'$ in Fig. 1. The axle B turns or fits loosely in the separate frames A A, so that when the machine is being drawn over uneven ground each frame A A, with its separate planting and seeding device, will rise and fall independently to suit the surface of the ground, there being no material interference from the draft-bars T' T', nor from the adjustable slotted arms G G, which hold the fulcrum $i'$ of the levers $l$ $l$, nor from any other part of the machine, and the separate planting devices K N K N of each frame A can be separately thrown either into or out of action upon the soil by means of the jointed braces S S and the swinging roller-frames R R, or their equivalent. By having the levers $l$ $l$ arranged at the rear end of the machine and an index-hand, $o$, on the rear and outside end of each axle $p$ $p$ of the seed-dropping cylinders H H, the operator, while walking behind and guiding the machine by handles F F, can there regulate the separate seeding devices so that they will drop their charges simultaneously or alternately, as required.

Now, I do not claim hanging a series of separate frames, each having a plow and a seed-dropper upon one axle, so that the plows will rise and fall independently of each other, as shown in No. 19,242 of United States patents; but what I believe is new is two or more separate frames A each provided with a separate seed dropping and planting device, and all constructed, hung, and arranged on the one axle B of the traction-wheels C C, so that the frames can not only rise and fall independently, but can be adjusted laterally to plant rows at different distances apart, and set to positively drop the seed either alternately or simultaneously from the several frames, as may be required, and separately thrown into and out of action, all substantially as hereinbefore described, and shown by the annexed drawings.

What I claim as my improvement in seed-planters, and desire to secure by Letters Patent, is—

1. The combination of the lever $e$, cam $f$, and spring $g$ with the piston $c$ and cell $d$ in the rotary cylinder H, forming the bottom of the seed-box J, the whole constituting an adjustable seed-dropping device that empties the seed-cell with a positive motion, as herein described.

2. The combination of the hinged frame R, carrying the roller Q, and the adjustable block O, carrying the coverer N, with the frame A, carrying the plow K, and supported forward thereof by a wheel or wheels, C, the plow and coverer being thrown into and out of action upon the soil by means of the jointed brace S, substantially as herein described.

3. The frames A A, hung separately on one driving-axle, B, so that they will rise and fall independently to suit the unevenness of the ground to be planted, and adjustable laterally to plant rows at different distances apart, and having equal and distinct seeding and planting devices, which are thrown into and out of action separately to plant rows of different lengths, and in either alternate or opposite hills, all substantially as herein described.

LEWIS R. WRIGHT.

Witnesses:
JOHN STEPHENS,
GEORGE W. HOWARD.